(12) United States Patent
Takahashi et al.

(10) Patent No.: US 12,448,223 B2
(45) Date of Patent: Oct. 21, 2025

(54) ARTICLE TRANSPORT FACILITY

(71) Applicant: Daifuku Co., Ltd., Osaka (JP)

(72) Inventors: Toyoki Takahashi, Komaki (JP);
Hidemoto Fukushima, Komaki (JP);
Keisuke Takeno, Komaki (JP); Satoshi Nitta, Komaki (JP)

(73) Assignee: Daifuku Co., Ltd., Osaka (JP)

( * ) Notice: Subject to any disclaimer, the term of this patent is extended or adjusted under 35 U.S.C. 154(b) by 203 days.

(21) Appl. No.: 18/241,352

(22) Filed: Sep. 1, 2023

(65) Prior Publication Data

US 2024/0076141 A1 Mar. 7, 2024

(30) Foreign Application Priority Data

Sep. 1, 2022 (JP) ................................. 2022-139479

(51) Int. Cl.
*B65G 47/46* (2006.01)
*G06Q 10/083* (2024.01)

(52) U.S. Cl.
CPC .................................... *B65G 47/46* (2013.01)

(58) Field of Classification Search
CPC ...... B64U 10/60; B65G 1/1373; B65G 47/46; G06Q 10/083; G06Q 10/08355
See application file for complete search history.

(56) References Cited

U.S. PATENT DOCUMENTS

| | | | |
|---|---|---|---|
| 10,613,533 B1* | 4/2020 | Payson | G05D 1/0088 |
| 11,232,388 B2* | 1/2022 | Singh | B66F 9/063 |
| 11,922,360 B2* | 3/2024 | Kairali | G06Q 10/083 |
| 2018/0137454 A1* | 5/2018 | Kulkarni et al. | |
| 2020/0202284 A1* | 6/2020 | Singh et al. | |
| 2022/0187847 A1* | 6/2022 | Cella et al. | |
| 2023/0222531 A1* | 7/2023 | Cella et al. | |
| 2025/0148414 A1* | 5/2025 | Al-Madani et al. | |

FOREIGN PATENT DOCUMENTS

JP 201994201 A 6/2019

* cited by examiner

*Primary Examiner* — Douglas A Hess
(74) *Attorney, Agent, or Firm* — The Webb Law Firm

(57) ABSTRACT

An article transport facility of the present invention includes: a transport vehicle that travels along a predetermined travel route and transports articles; an unmanned aerial vehicle that flies along a route and transports articles; a transfer section provided in correspondence with a processing device that processes articles, and to and from which articles that are processing targets of the processing device are transferred; and a storage section that is arranged at a location along the travel route and stores articles. The transport vehicle carries in articles to the storage section and carries out articles from the storage section, and the unmanned aerial vehicle transports articles between the storage section and the transfer section.

19 Claims, 5 Drawing Sheets

ARTICLE TRANSPORT FACILITY

CROSS-REFERENCE TO RELATED APPLICATION

This application claims priority to Japanese Patent Application No. 2022-139479 filed Sep. 1, 2022, the disclosure of which is hereby incorporated by reference in its entirety.

BACKGROUND OF THE INVENTION

1. Field of the Invention

The present invention relates to an article transport facility which includes a transport vehicle that travels along a predetermined travel route and transports an article, a transfer section that is provided in correspondence with a processing device for processing articles and that performs transfer of an article that is a processing target of the processing device, and a storage section that is arranged along the travel route and stores articles.

2. Description of Related Art

One example of such an article transport facility is disclosed in JP 2019-94201A (hereinafter referred to as "Patent Document 1"). The reference signs and names in parentheses in the description below are the reference signs and names used in Patent Document 1.

The article transport facility described in Patent Document 1 includes a transport vehicle (1) that travels along a predetermined travel route (transport route 99) and transports an article that is a processing target, such as a semiconductor substrate. Processing devices (91) are provided along the travel route (99) of the transport vehicle (1). The transport vehicle (1) carries in articles to the processing devices (91) and carries out articles from the processing devices (91). The processing devices (91) performs various types of processing on a processing target such as a semiconductor substrate. A processing target is sequentially subjected to processing by the various processing devices, and thus a product is ultimately obtained.

The article transport facility described in Patent Document 1 is also provided with a storage (92) and a temporary storage (93) for storing articles. The storage (92) and the temporary storage (93) are arranged at positions along the travel route (99) of the transport vehicle (1), and the transport vehicle (1) also transfers articles to and from the storage (92) and the temporary storage (93).

In a conventional article transport facility such as that described in Patent Document 1, in addition to providing the processing devices (91) at positions along the travel route (99) of the transport vehicle (1), it is also necessary to provide storage sections such as the storage (92) and the temporary storage (93). Also, in order to provide more space where the processing devices (91) and the storage sections (92, 93) can be disposed, that is to say more space along the travel route (99), it is necessary to increase the length of the travel route (99) of the transport vehicle (1), for example, which leads to the problem of an increase in equipment cost.

Also, in a conventional article transport facility such as that described in Patent Document 1, the transport vehicle (1) transfers articles to and from the processing devices (91), transfers articles to and from the storage sections (92, 93), and transports articles between the processing devices (91), the storage sections (92, 93), and the like. In other words, the transport vehicle (1) is required to play many roles. For this reason, a long wait time can possibly elapse from when a processing device (91) is able to immediately start performing article processing until when an article is carried in to the processing device (91) by the transport vehicle (1), and a long wait time can possibly elapse from when the processing device (91) completes article processing until when the article is carried out from the processing device (91) by the transport vehicle (1).

SUMMARY OF THE INVENTION

In light of the above-described situation, there is a demand for realization of an article transport facility that can efficiently transport articles while having a low equipment cost.

In view of the foregoing, an article transport facility according to an aspect includes:
a transport vehicle configured to travel along a predetermined travel route and perform article transport;
an unmanned aerial vehicle configured to fly along a route and perform article transport;
a transfer section provided in correspondence with a processing device configured to perform article processing, and to and from which an article that is a processing target of the processing device is transferred; and
a storage section arranged at a location along the travel route and configured to perform article storage,
wherein the transport vehicle performs article carry-in and article carry-out with respect to the storage section, and the unmanned aerial vehicle performs article transport between the storage section and the transfer section.

According to this configuration, even if the processing device and the transfer section corresponding thereto are arranged in a region separated from the travel route of the transport vehicle, the unmanned aerial vehicle can transfer an article between the storage section and the transfer section. In other words, the processing device and the transfer section corresponding thereto are not required to be provided in a region along the travel route of the transport vehicle. As a result, the cost of installation of the travel route of the transport vehicle is reduced.

Also, in the case where an article becomes needed in the processing device or processing of an article in the processing device is complete, the article can be quickly transported by the unmanned aerial vehicle, without waiting for the arrival of the transport vehicle. Therefore, it is easy to improve the efficiency of article transport between the storage section and the transfer section, thus making it is easy to improve the efficiency of article processing performed by the processing device.

It is thus possible to realize an article transport facility that can efficiently transport articles while also having a low equipment cost.

Further features and advantages of the technology according to the present disclosure will become clearer from the following description of exemplary and non-limiting embodiments given with reference to the drawings.

DESCRIPTION OF THE INVENTION

1. Embodiment

Figure 1:
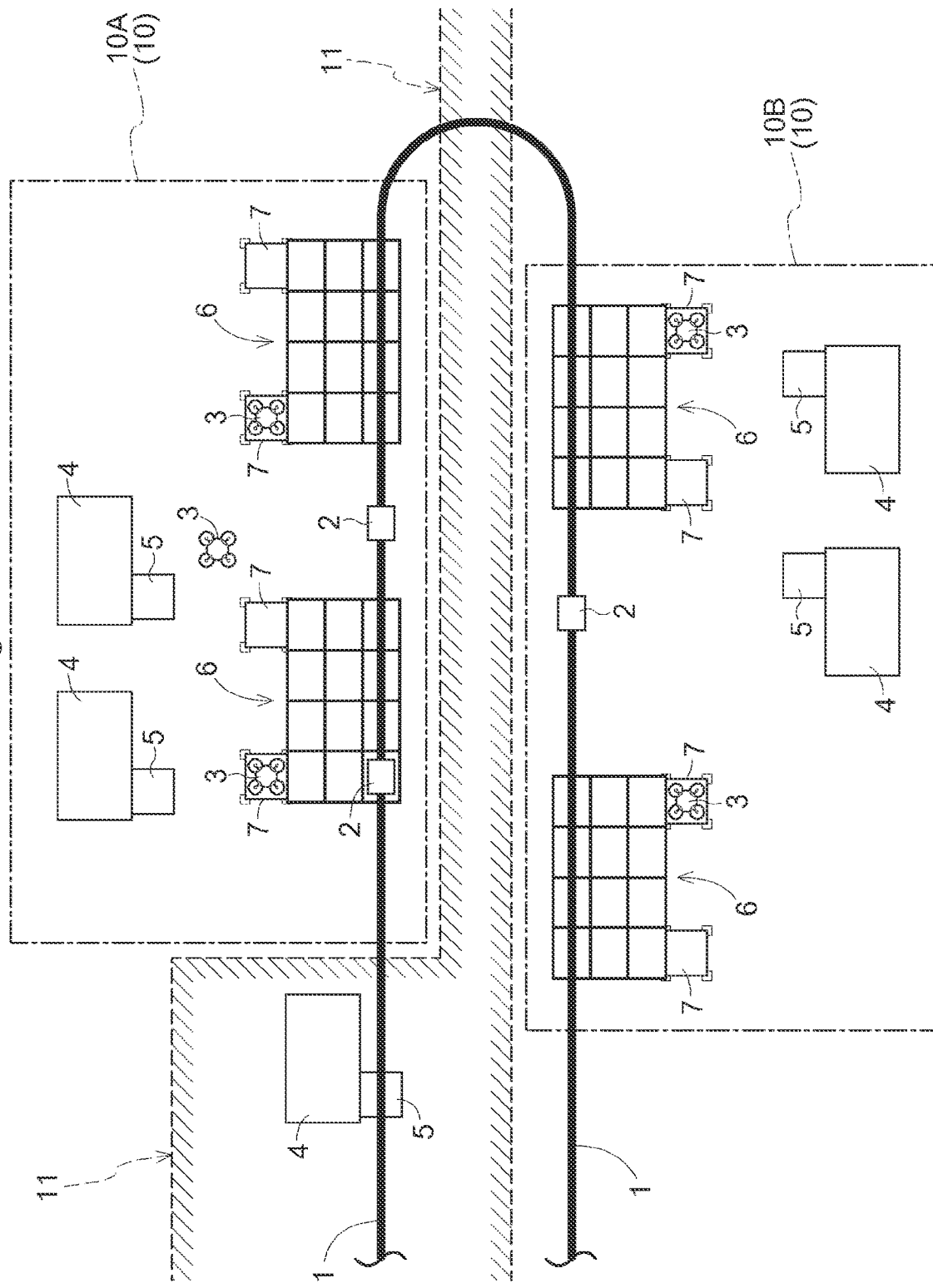
FIG. 1 is a plan view showing an example of a layout of an article transport facility.

An article transport facility according to the present embodiment will be described below with reference to the drawings. A route extending direction X, a route width direction Y, and an up-down direction Z, which are three directions orthogonal to each other, are shown in the figures (see FIGS. 3 to 6). The route extending direction X is the direction along a travel route 1 (in FIGS. 4 and 5, the direction along straight portions of the travel route 1), a first side X1 is one side in the route extending direction X, and a second side X2 is the opposite side in the route extending direction X. The route width direction Y is the direction orthogonal to the route extending direction X (here, the horizontal direction orthogonal to the route extending direction X) in a vertical view along the up-down direction Z, a first side Y1 is one side in the route width direction Y, and a second side Y2 is the opposite side in the route width direction Y. A lower side Z1 and an upper side Z2 related to the up-down direction Z are also shown.

The article transport facility includes transport vehicles 2 that travel along a predetermined travel route 1 and transport articles 12, transfer sections 5 that are provided in correspondence with processing devices 4 for performing processing on the articles 12 and that perform transfer of the articles 12 that are processing targets of the processing devices 4, and storage sections 6 that are arranged along the travel route 1 and store the articles 12. The transport vehicles 2 carry in the articles 12 to the storage sections 6 and carry out the articles 12 from the storage sections 6. The transport vehicles 2 may also transfer the articles 12 to and from the transfer sections 5. The article transport facility also includes unmanned aerial vehicles 3 that fly along desired routes and transport the articles 12. The unmanned aerial vehicles 3 transport the articles 12 between the storage sections 6 and the transfer sections 5.

In the illustrated example, the article transport facility includes a plurality of unmanned aerial vehicles 3, a plurality of transfer sections 5, and a plurality of storage sections 6. The number of transport vehicles 2, the number of unmanned aerial vehicles 3, the number of processing devices 4, the number of transfer sections 5, and the number of storage sections 6 in the article transport facility can be set as appropriate.

Figure 2:
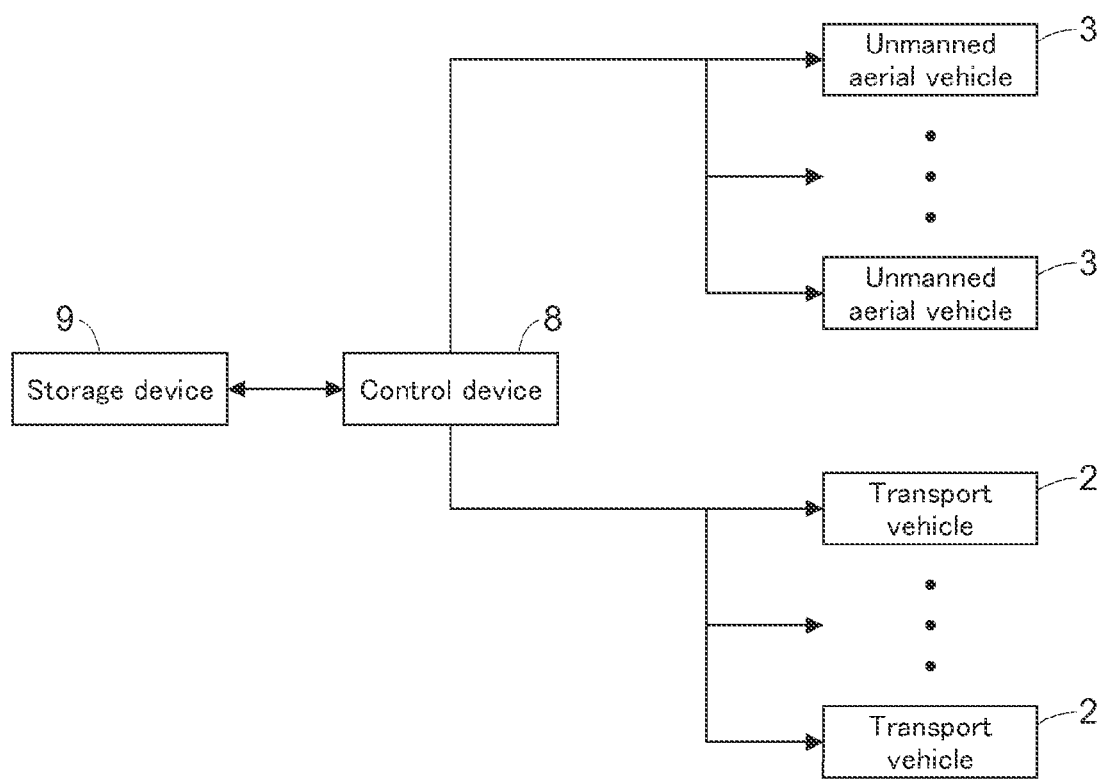
FIG. 2 is a control block diagram of the article transport facility.

As shown in FIG. 2, the article transport facility further includes a control device 8, and also includes a storage device 9 for storing information handled by the article transport facility. The control device 8 controls the unmanned aerial vehicles 3 and the transport vehicles 2.

Processing Device

The processing devices 4 are semiconductor processing devices for performing various types of processing such as exposure processing and etching processing. In this case, in the article transport facility, the articles 12 that are transported are containers that contain a wafer for use as a semiconductor substrate, a reticle used for exposure processing of the wafer in the semiconductor substrate manufacturing process, and the like. For example, a reticle is transported in a dedicated container called a reticle pod. Also, a wafer is transported in a dedicated container called a FOUP (Front Opening Unified Pod). The processing devices 4 are each provided with a transfer section 5, and the articles 12 to be transported are carried in to and carried out from the processing devices 4 via the transfer sections 5. Alternatively, a target object (e.g., a wafer or a reticle) may be taken out of an article 12 on a transfer section 5 and carried in to the corresponding processing device 4, and a target object may be carried out from a processing device 4 and stored in an article 12 placed on the corresponding transfer section 5. The operations of the transport vehicles 2 when the transport vehicles 2 transfer articles 12 to and from the transfer sections 5 are similar to later-described operations of the transport vehicles 2 when the transport vehicles 2 transfer articles 12 to and from the storage sections 6.

Transport Vehicle

The transport vehicles 2 can transport the articles 12 between the storage sections 6. One or more transport vehicles 2 can be provided in the article transport facility, and the number of vehicles can be changed as appropriate. The transport vehicles 2 described in the present embodiment are so-called overhead transport vehicles that travel along the travel route 1 realized by rails installed on the ceiling of the space, for example.

Figure 3:
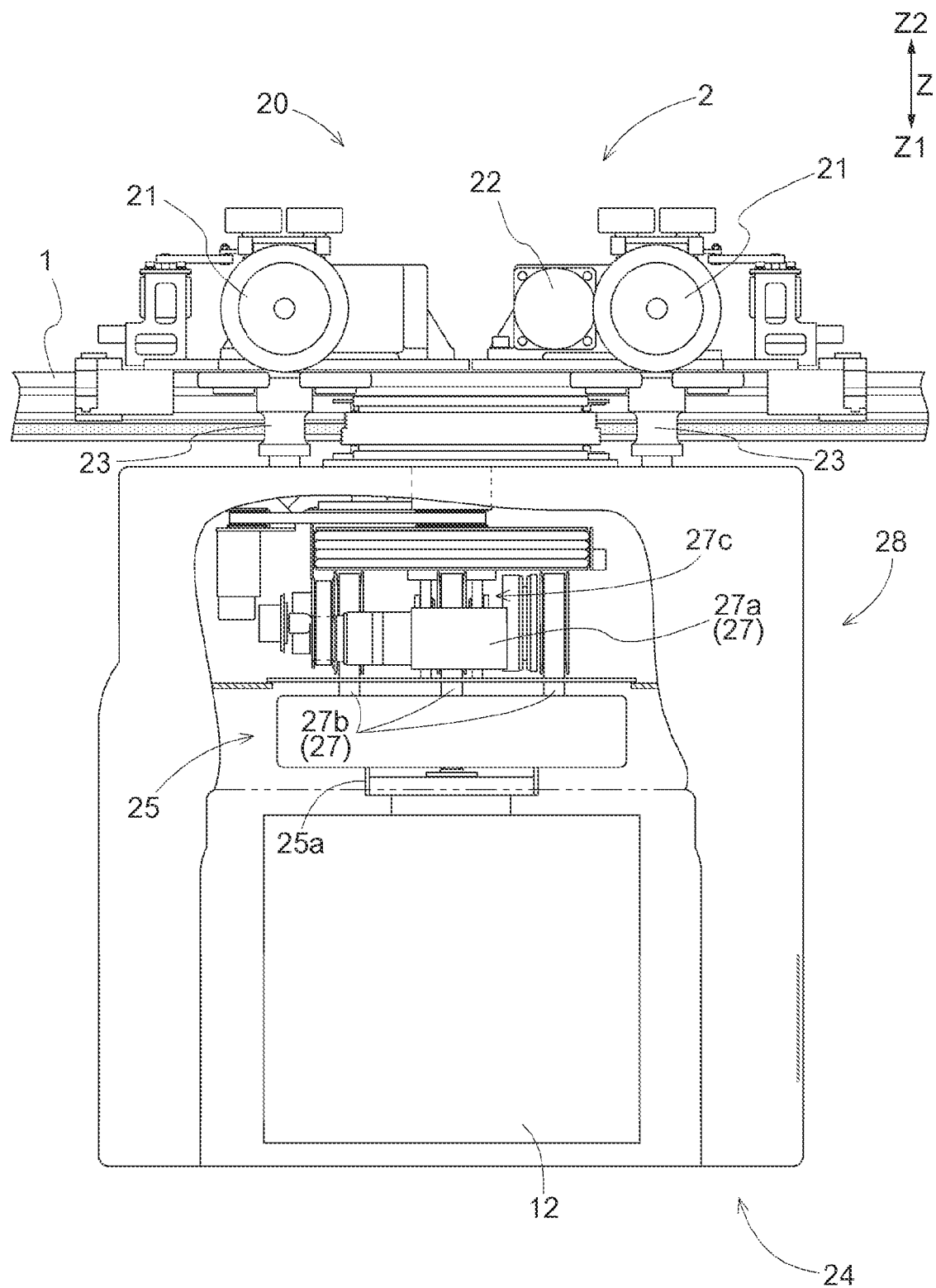
FIG. 3 is a side view of a transport vehicle.

As shown in FIG. 3, each of the transport vehicles 2 includes a traveling section 20, a vehicle body section 24, and coupling sections 23 that couple the traveling section 20 and the vehicle body section 24 to each other. The traveling section 20 is arranged on the upper side Z2 of the travel route 1. The vehicle body section 24 is coupled to the traveling section 20 by the coupling sections 23, and is arranged on the lower side Z1 of the travel route 1. The transport vehicle 2 also includes a cover section 28 that covers the article 12 held by a holding section 25.

The traveling section 20 has a plurality of traveling wheels 21 that roll on the travel route 1. At least one of the traveling wheels 21 is driven by a traveling motor 22 to roll on the travel route 1.

The vehicle body section 24 of the transport vehicle 2 includes the holding section 25 that holds an article 12 in a suspended manner, and an elevating device 27 that raises and lowers the holding section 25.

The holding section 25 is configured to hold the article 12 by gripping grip sections of the article 12. The holding section 25 has a pair of gripping claws 25a (only one of which is shown in FIG. 3) for gripping the grip sections of the article 12. By being driven by a gripping motor (not shown), the pair of gripping claws 25a can be changed between a gripping orientation of having been moved toward each other to grip the article 12, and a release orientation of having been moved away from each other to release the article 12.

The elevating device 27 raises and lowers the holding section 25 and the article 12 held thereby. In the present embodiment, the elevating device 27 includes elevating belts 27b coupled to the holding section 25, an elevating drum 27c around which the elevating belts 27b are wound, and an elevating motor 27a that drives the elevating drum 27c to rotate. When the elevating drum 27c is driven to rotate by the elevating motor 27a, the elevating belts 27b are wound in or wound out, that is to say, the holding section 25 is raised or lowered.

Storage Section

Figure 4:
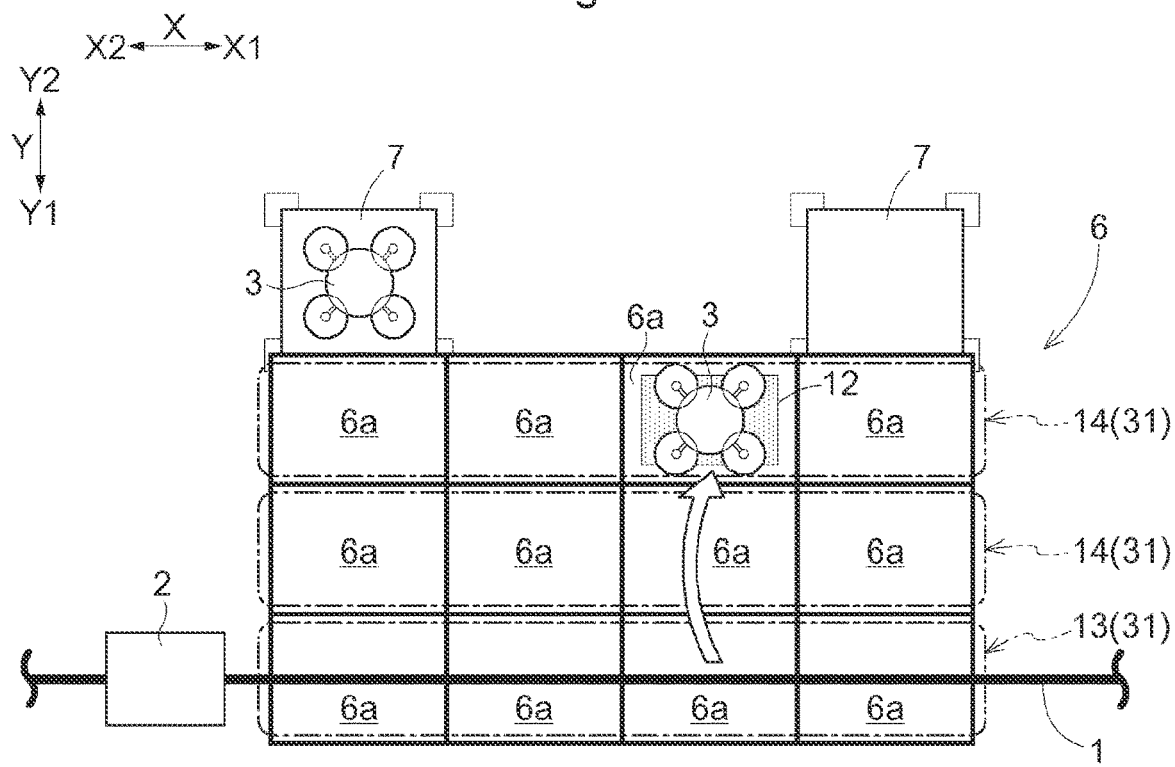
FIG. 4 is a schematic plan view of a storage section.
Figure 5:
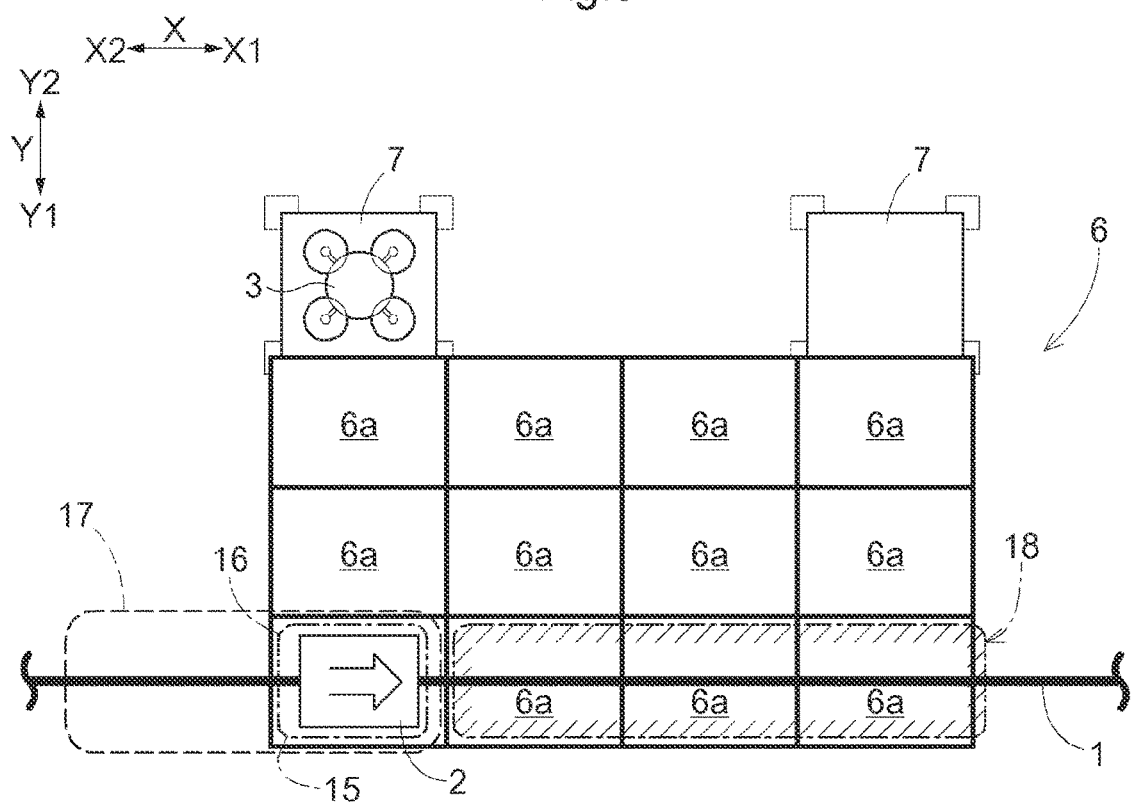
FIG. 5 is a schematic plan view of a storage section.
Figure 6:
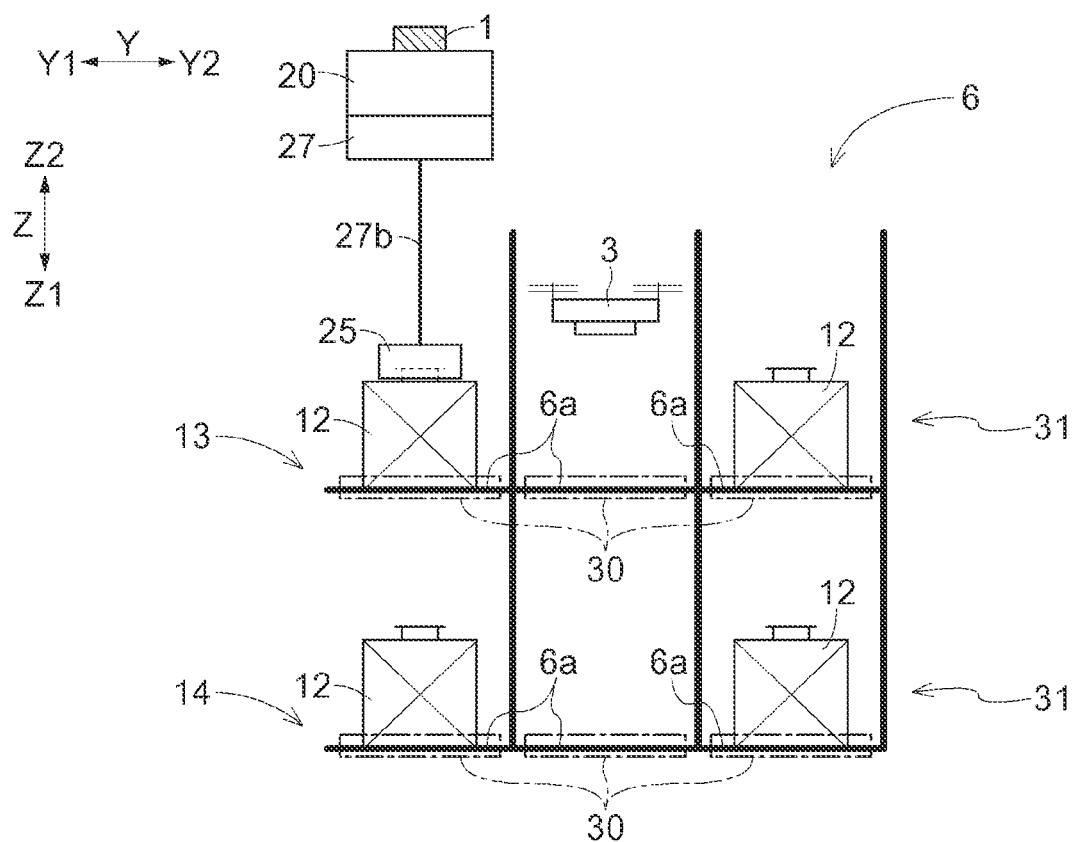
FIG. 6 is a schematic side view of a storage section.

As shown in FIGS. 4 to 6, the storage section 6 includes a plurality of storage locations 6a for storing articles 12. The storage locations 6a of the storage section 6 are located on the lower side Z1 relative to the transport vehicle 2, and the transport vehicle 2 can transfer articles 12 to and from the storage locations 6a. In other words, in the present embodiment, the storage locations 6a located on the lower side Z1 relative to the travel route 1, along which the transport vehicle 2 travels, are transferable locations 13 to and from which the transport vehicle 2 carries in and carries out the articles 12. Here, "the lower side Z1 relative to the travel route 1" means a location that is on the lower side Z1 relative to the travel route 1 while also overlapping the travel route 1 in a vertical view. For example, the transport vehicle 2 can transfer an article 12 to and from a transferable location 13 by lowering the holding section 25 from the upper side Z2 toward the transferable location 13 with use of the elevating device 27.

In the present embodiment, some of the storage locations 6a are transferable locations 13 to and from which articles 12 are carried in and carried out by the transport vehicle 2, and the other storage locations 6a are non-transferable locations 14 to and from which articles 12 can be neither carried in nor carried out by the transport vehicle 2. In the example shown in FIG. 4, the non-transferable locations 14 are located on the second side Y2 in the width direction when viewed from the transferable locations 13.

Since the elevating device 27 of the transport vehicle 2 raises and lowers the holding section 25 along the up-down direction Z, the storage locations 6a located on the lower side Z1 relative to the travel route 1 are transferable locations 13, and the storage locations 6a not located on the lower side Z1 relative to the travel route 1 are non-transferable locations 14. Note that the unmanned aerial vehicles 3 can move articles 12 between the transferable locations 13 and the non-transferable locations 14. Alternatively, an unmanned aerial vehicle 3 may transport an article 12 at a transferable location 13 to a transfer section 5.

In the example shown in FIG. 6, each of the storage sections 6 includes a plurality of storage levels 31. The storage locations 6a located on the lower side Z1 relative to the travel route 1 in the uppermost storage level 31 are transferable locations 13, and the other storage locations 6a are non-transferable locations 14. Thus, in this example, the storage locations 6a located on the lower side Z1 relative to the travel route 1 in each storage level 31 other than the uppermost level are non-transferable locations 14. A later-described waiting site 7 may be provided at a location on the lower side Z1 relative to the travel route 1 in each storage level 31 other than the uppermost level. Also, in the case where, for example, the transport vehicle 2 includes a mechanism for moving the holding section 25 in the route width direction Y, a configuration is possible in which transferable locations 13 are provided in a storage level 31 other than the uppermost level, and a configuration is possible in which transferable locations 13 are provided in all of the storage levels 31.

The storage section 6 includes a plurality of storage location rows 30, each of which includes a plurality of storage locations 6a aligned in the route extending direction X, and the storage location rows 30 are arranged next to each other in at least either the up-down direction Z or the route width direction Y. In FIG. 6, the storage section 6 includes storage location rows 30 arranged next to each other in both the up-down direction Z and the route width direction Y. In other words, the storage section 6 includes a plurality of storage levels 31, each having a plurality of storage location rows 30 arranged next to each other in the route width direction Y, and the storage levels 31 are arranged next to each other in the up-down direction Z.

Also, as shown in FIGS. 1, 4, and 5, the storage section 6 has a waiting site 7 where an unmanned aerial vehicle 3 can take off and land, and where an unmanned aerial vehicle 3 can wait. The waiting site 7 is a dedicated location for the landing of an unmanned aerial vehicle 3, and no articles 12 are stored at the waiting site 7. The waiting site 7 may be provided with power supply equipment for supplying power to the battery of the landed unmanned aerial vehicle 3, for example. In this case, while the unmanned aerial vehicle 3 has landed at the waiting site 7, the battery of the unmanned aerial vehicle 3 can be charged.

Operations of Transport Vehicle and Unmanned Aerial Vehicle

As shown in FIG. 1, the control device 8 sets a plurality of transport areas 10 each including at least one transfer section 5 and at least one storage section 6, and, for each of the transport areas 10, the control device 8 assigns at least one unmanned aerial vehicle 3 to transport articles 12 in the transport area 10. In the example shown in FIG. 1, the transport areas that are set include a first transport area 10A that has two storage sections 6, two processing devices 4, and two transfer sections 5, and a second transport area 10B that has two storage sections 6, two processing devices 4, and two transfer sections 5. Thus, a correspondence relationship of one or more transfer sections 5 for each of the storage sections 6 is set. Each of the unmanned aerial vehicles 3 transports articles 12 between a corresponding storage section 6 and one or more corresponding transfer sections 5 according to the correspondence relationship. In other words, each of the unmanned aerial vehicles 3 transports articles 12 between a storage section 6 and a transfer section 5 included in the assigned transport area 10. In the present embodiment, the unmanned aerial vehicles 3 do not transport articles 12 between storage sections 6 included in the assigned transport area 10, and do not transport articles 12 between transfer sections 5 included in the assigned transport area 10.

Note that if an unmanned aerial vehicle 3 flies in an area that can be entered by people, there is a danger of a collision between a person (such as a worker) and the unmanned aerial vehicle 3. For this reason, in the example shown in FIG. 1, the control device 8 sets a no-fly area 11, in which the flight of the unmanned aerial vehicles 3 is prohibited, between the first transport area 10A, which is one transport area 10, and the second transport area 10B, which is a transport area 10 different from the first transport area 10A. Therefore, even if a person enters the no-fly area 11, a collision will not occur between the person and an unmanned aerial vehicle 3.

The no-fly area 11 in FIG. 1 includes a processing device 4 and a transfer section 5. In this case, the control device 8 causes a transport vehicle 2 to transport articles 12 to and from the transfer section 5 included in the no-fly area 11.

In addition to preventing collisions between people and unmanned aerial vehicles 3, it is also necessary to prevent collisions between a transport vehicle 2 and an unmanned aerial vehicle 3. For example, in consideration of the fact that both the transport vehicles 2 and the unmanned aerial vehicles 3 operate near the transferable locations 13, a collision between a transport vehicle 2 and an unmanned aerial vehicle 3 can possibly occur near a transferable location 13. In the present embodiment, letting a transport vehicle stop location 15 along the travel route 1 be a location at which a transport vehicle 2 stops in order to carry in an article 12 to a storage section 6 or carry out an article 12 from the storage section 6, and letting a transfer location 16 along the travel route 1 be a location at which an article 12 is transferred to or from the transport vehicle 2 in the storage section 6, in order to prevent a collision such as that described above, as shown in FIG. 5, in the case where a transport vehicle 2 is in a specified range 17 that includes the transport vehicle stop location 15, the control device 8 prohibits arrival of an unmanned aerial vehicle 3 at the transfer location and entry of an unmanned aerial vehicle 3 into a given range (i.e., a range 18 shown in FIG. 5) that extends forward in the travel direction of the transport vehicle 2 (i.e., extends toward the first side X1 in the extending direction) from the transport vehicle stop location 15.

As described above, the unmanned aerial vehicles 3 each transport articles 12 within a predetermined transport area 10, but the number of article 12 transport requests that are issued to unmanned aerial vehicles 3 per unit time may differ significantly among the transport areas 10. In view of this, it is preferable to employ a configuration in which, for example, a larger number of unmanned aerial vehicles 3 are arranged in a transport area 10 where the number of article 12 transport requests issued to unmanned aerial vehicles 3 per unit time is larger, and that a smaller number of unmanned aerial vehicles 3 are arranged in a transport area 10 where the number of article 12 transport requests issued to unmanned aerial vehicles 3 per unit time is smaller. To achieve this, the control device 8 calculates a degree of busyness regarding the transport of articles 12 by unmanned aerial vehicles 3 in each of the transport areas 10.

For example, the control device 8 stores in the storage device 9 at least one of first time, which is the length of time from when a request is given for an article 12 processed by a processing device 4 to be retrieved at the corresponding transfer section 5 until when that article 12 is retrieved by an unmanned aerial vehicle 3, and second time, which is the length of time from when a request is given for an article 12 to be transferred to a transfer section 5 in order for the article 12 to be processed by the corresponding processing device 4 until when that article 12 is transported to the transfer section 5 by an unmanned aerial vehicle 3, and furthermore obtains the degree of busyness by calculating the average value of at least one of the first time and the second time in a predetermined period.

For example, in the case where the number of unmanned aerial vehicles 3 assigned to transport articles 12 in a certain transport area 10 is relatively small compared to the number of article 12 transport requests issued per unit time in that transport area 10, the average value (i.e., the degree of busyness) of at least one of the first time and the second time is a relatively large value. On the other hand, in the case where the number of unmanned aerial vehicles 3 assigned to transport articles 12 in a certain transport area 10 is relatively large compared to the number of article 12 transport requests issued per unit time in that transport area 10, the average value (i.e., the degree of busyness) of at least one of the first time and the second time is a relatively small value. In this way, the degree of busyness indicates whether the number of unmanned aerial vehicles 3 is excessive or insufficient relative to the number of article 12 transport requests issued per unit time.

Then, for each of the transport areas 10, the control device 8 sets the number of unmanned aerial vehicles 3 assigned to transport articles 12 in the transport area 10 such that the degree of busyness in the transport area 10 approaches a set value, that is to say, the control device 8 re-performs setting for assigning at least one unmanned aerial vehicle 3 to transport articles 12 in each transport area 10. For example, the control device 8 uses the same value as the set value for all of the transport areas 10. As one example, in the case where the average value (i.e., the above-described degree of busyness) of at least one of the first time and the second time in the first transport area 10A is smaller than the set value, and furthermore the average value (i.e., the above-described degree of busyness) of at least one of the first time and the second time in the second transport area 10B is larger than the set value, the control device 8 re-performs setting (i.e., setting for assigning at least one unmanned aerial vehicle 3 to transport articles 12 in each transport area 10) such that one unmanned aerial vehicle 3 that was assigned to transport articles 12 in the first transport area 10A is re-assigned to transport articles 12 in the second transport area 10B.

Alternatively, instead of moving an unmanned aerial vehicle 3 between transfer areas 10, a configuration is possible in which the control device 8 increases the number of unmanned aerial vehicles 3 assigned to transport articles 12 in a specific transport area 10 by causing a separately prepared and waiting (i.e., not yet in operation) unmanned aerial vehicle 3 to operate in the specific transport area 10. As another alternative, a configuration is possible in which the control device 8 decreases the number of unmanned aerial vehicles 3 assigned to transport articles 12 in a specific transport area 10 by causing an unmanned aerial vehicle 3 assigned to transport articles 12 in the specific transport area 10 to enter a standby state (i.e., no longer operate). As yet another alternative, the control device 8 may employ the movement of an unmanned aerial vehicle 3 between transport areas 10, the operation of a new unmanned aerial vehicle 3, and also the instruction to enter the standby state in order to re-perform setting for assigning unmanned aerial vehicles 3 to transport articles 12 in the transport areas 10.

When changing the number of unmanned aerial vehicles 3 assigned to transport articles 12 in the transport areas 10, the control device 8 may cause an unmanned aerial vehicle 3 to fly between two transport areas 10 as long as a no-fly area 11 has not been set between those two transport areas 10. If a no-fly area 11 has been set between the two transport areas 10, the control device 8 may transport the unmanned aerial vehicle 3 with use of a transport vehicle 2. For example, the control device 8 causes the corresponding unmanned aerial vehicle 3 to fly to a transferable location 13 in a storage section 6, causes the holding section 25 of a transport vehicle 2 to retrieve the unmanned aerial vehicle 3, and transports the unmanned aerial vehicle 3 to a transferable location 13 in a storage section 6 in the other transport area 10. In this manner, the transport vehicle 2 is configured to not only transport articles 12, but also transport an unmanned aerial vehicle 3 between the first transport area 10A and the second transport area 10B.

2. Other Embodiments

Next, other embodiments of the article transport facility will be described.

(1) Although the transport vehicle 2 is an overhead transport vehicle in the above embodiment, the transport vehicle 2 is not limited to this. For example, the transport vehicle 2 may be another moving body such as an AGV (Automated Guided Vehicle) or an STV (Sorting Transfer Vehicle).

(2) Although the processing device 4 is a semiconductor processing device in the above embodiment, the processing device 4 is not limited to this. For example, the processing device 4 may be a sorting device that sorts the articles 12. In this case, the articles 12 are containers containing a plurality of products, for example. Alternatively, the processing device 4 may be a manufacturing device or the like that manufactures products. In this case, the articles 12 are the products manufactured by the manufacturing device.

(3) In the above embodiment, an example is described in which the transport vehicle 2 transfers an article 12 to and from the transfer section 5 of a processing device 4, but a configuration is possible in which the transport vehicle 2 does not transfer an article 12 to and from the transfer section 5 of a processing device 4. For example, even in the case where a transfer section 5 is arranged at a position where an article 12 can be transferred thereto or therefrom by the transport vehicle 2, if that transfer section 5 is not included in the no-fly area 11, the article 12 may be transferred to or from the transfer section 5 by an unmanned aerial vehicle 3 instead of the transport vehicle 2.

(4) Although an example of the configuration of the storage locations 6a of the storage section 6 is described in the above embodiment, the configuration of the storage locations 6a of the storage section 6 can be changed as appropriate. For example, the storage section 6 may include one or more storage locations 6a. Also, the storage section 6 may be an automated warehouse having a stacker crane or the like, or a storage area set on the floor, for example.

(5) In the above embodiment, if the transport area 10 assigned to an unmanned aerial vehicle 3 includes a plurality of storage sections 6, the unmanned aerial vehicle 3 may transport articles 12 between those storage sections 6. Similarly, if the transport area 10 assigned to an unmanned aerial vehicle 3 includes a plurality of transfer sections 5, the unmanned aerial vehicle 3 may transport articles 12 between those transfer sections 5.

(6) Although the waiting site 7 is arranged at a dedicated location adjacent to the corresponding storage section 6 in the above embodiment, the waiting site 7 may be disposed at another location. For example, a storage location 6a of a storage section 6 may also be used as the waiting site 7, or a storage location 6a may be used both for the storage of an article 12 and for the waiting of an unmanned aerial vehicle 3.

Alternatively, the waiting site 7 may be disposed adjacent to the transfer section 5, or may be disposed at a position away from the storage section 6 and the transfer section 5.

(7) In the above embodiment, the unmanned aerial vehicle 3 may have a wired-connection configuration and have a feeder line, a signal line, or the like connected thereto. In this case, the waiting site 7 may be provided with a winding device or the like for the power supply line, the signal line, or the like.

(8) In the above embodiment, a configuration is possible in which the no-fly area 11 is not be provided in the article transport facility. Also, two or more transport areas 10 may partially overlap each other.

(9) In the above embodiment, the no-fly area 11 may be fixed in advance or may be changeable. The following aspects are conceivable examples of cases where the setting of the no-fly area 11 can be changed. A human presence sensor, a surveillance camera, or the like is used to monitor the presence or absence of a person in a specific area. If no person is present in the specific area, the control device 8 permits the flight of an unmanned aerial vehicle 3 in the specific area, that is to say does not set the specific area to a no-fly area. On the other hand, if a person is present in the specific area, the control device 8 prohibits the flight of an unmanned aerial vehicle 3 in the specific area, that is to say sets the specific area to a no-fly area.

(10) In the above-described embodiment, the average value of at least one of the first time and the second time is calculated as the degree of busyness, but another value may be calculated as the degree of busyness.

For example, the control device 8 calculates an operating time for each of the unmanned aerial vehicles 3, which is the time for which the unmanned aerial vehicle 3 is engaged in transporting articles 12 (e.g., the time for which the unmanned aerial vehicle 3 is not waiting at the waiting site 7) in a predetermined period, and stores the operating time in the storage device 9. For each of the unmanned aerial vehicles 3, the control device 8 derives the ratio of the operating time to the predetermined period, as an operating rate. The control device 8 obtains the degree of busyness by calculating the average value of the operating rates of the one or more unmanned aerial vehicles 3 assigned to transport articles 12 in a transport area 10. In other words, it can be said that the larger the average value of the operating rate of the one or more unmanned aerial vehicles 3 (i.e., the degree of busyness) is, the higher the load on the unmanned aerial vehicles 3 in the transport area 10 is, whereas the smaller the average value of the operating rate of the one or more unmanned aerial vehicles 3 (i.e., the degree of busyness) is, the lower the load on the unmanned aerial vehicles 3 in the transport area 10 is.

(11) In the above embodiment, an example is described in which, in the case of performing setting for bringing the degrees of busyness in a plurality of transport areas 10 closer to a set value, the control device 8 uses the same value as the set value for all of the transport areas 10, but the set value may be set separately for each of the transport areas 10. For example, if there is a transport area 10 in which there is a desire for the unmanned aerial vehicles 3 to transport articles 12 particularly quickly, an administrator or the like of the article transport facility may use an input device or the like to give the control device 8 an instruction to lower the set value in order to lower the degree of busyness in that transport area 10 (i.e., bring the degree of busyness closer to a smaller set value).

(12) In the above embodiment, an example is described in which the control device 8 controls the operations of the transport vehicles 2 and the unmanned aerial vehicles 3 as shown in FIG. 2, for example, but the configuration of the control device 8 can be changed as appropriate. For example, a configuration is also possible in which the control device 8 is provided as a device for integrally controlling a plurality of controllers provided in the article transport facility, such as a controller provided for controlling the operations of the transport vehicles 2 and a controller provided for controlling the operations of the unmanned aerial vehicles 3. Alternatively, the functions of the control device 8 may be performed by an existing controller provided in the article transport facility, such as a controller provided to control the operations of the transport vehicles 2.

3. Overview of Embodiments

The following describes an overview of the article transport facility described above.

An article transport facility according to an aspect includes: a transport vehicle configured to travel along a predetermined travel route and perform article transport; an unmanned aerial vehicle configured to fly along a route and perform article transport; a transfer section provided in correspondence with a processing device configured to perform article processing, and to and from which an article that is a processing target of the processing device is transferred; and a storage section arranged at a location along the travel route and configured to perform article storage, wherein the transport vehicle performs article carry-in and article carry-out with respect to the storage section, and the unmanned aerial vehicle performs article transport between the storage section and the transfer section.

According to this configuration, even if the processing device and the transfer section corresponding thereto are arranged in a region separated from the travel route of the transport vehicle, the unmanned aerial vehicle can transfer an article between the storage section and the transfer section. In other words, the processing device and the transfer section corresponding thereto are not required to be provided in a region along the travel route of the transport vehicle. As a result, the cost of installation of the travel route of the transport vehicle is reduced. Also, in the case where an article becomes needed in the processing device or processing of an article in the processing device is complete, the article can be quickly transported by the unmanned aerial vehicle, without waiting for the arrival of the transport vehicle. Therefore, it is easy to improve the efficiency of article transport between the storage section and the transfer section, thus making it is easy to improve the efficiency of article processing performed by the processing device. It is thus possible to realize an article transport facility that can efficiently transport articles while also having a low equipment cost.

It is preferable that the article transport facility further includes: a plurality of the unmanned aerial vehicles each of which corresponds to the unmanned aerial vehicle; a plurality of the transfer sections each of which corresponds to the transfer section; and a plurality of the storage sections each of which corresponds to the storage section, wherein the transport vehicle performs article transport between the plurality of storage sections, each of the plurality of storage sections has a correspondence relationship to one or more transfer sections of the plurality of transfer sections, and each of the unmanned aerial vehicles performs article transport between the storage section and the one or more transfer sections having the correspondence relationship to each other.

According to this configuration, the transport vehicle transports articles between storage sections, and the unmanned aerial vehicle transports articles between a storage section and a transfer section that have been set in correspondence with each other in advance. For example, even if an area that is not suitable for the flying of an unmanned aerial vehicle, such as an area where people may be located or an area with many obstacles, is between one storage section and another storage section, articles can be transported between such storage sections by the transport vehicle. In this way, the transport of articles can be appropriately shared between the transport vehicle and the unmanned aerial vehicle. Additionally, it is possible to limit the flight range of the unmanned aerial vehicle if a storage section and a transfer section that are in correspondence with each other are arranged within a relatively short distance, for example. This makes it possible to facilitate the supply of energy to the unmanned aerial vehicle and facilitate flight control.

Also, it is preferable that the storage section has a waiting site at which the unmanned aerial vehicle is capable of taking off and landing, and at which the unmanned aerial vehicle that landed is capable of waiting.

According to this configuration, the unmanned aerial vehicle can be caused to wait at a position near articles stored in the storage section. For this reason, when an article becomes needed in the processing device, an article can be quickly transported from the storage section to the processing device by the unmanned aerial vehicle. Therefore, it is easy to improve the efficiency of article transport between the storage section and the transfer section, thus making it is easy to improve the efficiency of article processing performed by the processing device.

Also, it is preferable that the article transport facility further includes a control device configured to control the plurality of unmanned aerial vehicles, the control device sets a plurality of transport areas each including at least one of the plurality of transfer sections and at least one of the plurality of storage sections, and the control device assigns each of the plurality of transport areas for at least one unmanned aerial vehicle of the plurality of unmanned aerial vehicles to perform article transport.

According to this configuration, even if the article transport facility extends over a large area overall, it is possible to set a plurality of transport areas and assign at least one unmanned aerial vehicle to each of the transport areas, thus making it possible to limit the flight distance of each of the unmanned aerial vehicles. Therefore, it is easy to improve the efficiency of article transport performed by the unmanned aerial vehicles, thus making it easy to improve the efficiency of article processing performed by the processing device.

Also, it is preferable that the control device calculates a degree of busyness regarding article transport performed by the at least one unmanned aerial vehicle in each of the plurality of transport areas, and the control device sets the number of the at least one unmanned aerial vehicle performing article transport in each of the plurality of transport areas in such a manner that the degree of busyness approaches a set value in each of the plurality of transport areas.

According to this configuration, the number of unmanned aerial vehicles in each transport area is set such that the degree of busyness of unmanned aerial vehicles approaches the set value in each transport area. In other words, the number of unmanned aerial vehicles assigned to each transport area is set such that the degree of busyness of unmanned aerial vehicles in each transport area approaches a desired state.

Also, it is preferable that the control device calculates, as the degree of busyness, the average value of at least one of (i) first time which is a length of time from when a request is given for an article processed by the processing device to be retrieved at the transfer section until when the processed article is retrieved by the unmanned aerial vehicle, and (ii) second time which is a length of time from when a request is given for an article to be transferred to the transfer section in order for the article to be processed by the processing device until when the article is transported to the transfer section by the unmanned aerial vehicle.

According to this configuration, it is possible to calculate the degree of busyness according to the length of waiting time during which the processing device waits for the carrying in and carrying out of articles. Therefore, if the number of unmanned aerial vehicles in each of the transport areas is set in accordance with the degree of busyness, it becomes easier to increase the efficiency of article processing performed by the processing device.

Also, it is preferable that the control device sets a no-fly area in which flight of the unmanned aerial vehicle is prohibited, in a region between a first transport area that is one of the plurality of transport areas and a second transport area that is one of the plurality of transport areas different from the first transport area, and the transport vehicle, in addition to performing article transport, is further configured to transport the unmanned aerial vehicle between the first transport area and the second transport area.

According to this configuration, even if a no-fly area, where unmanned aerial vehicles are prohibited from flying, is set between the first transport area and the second transport area, an unmanned aerial vehicle can be transported between the first and second transport areas.

Also, it is preferable that the article transport facility further includes: a plurality of unmanned aerial vehicles each of which corresponds to the unmanned aerial vehicle; and a control device configured to control the plurality of unmanned aerial vehicles, wherein in response to the transport vehicle being in a specified range including a transport vehicle stop location, which is a location along the travel route at which the transport vehicle stops in order to perform article carry-in or article carry-out with respect to the storage section, the control device prohibits (i) arrival of the unmanned aerial vehicle at a transfer location, which is a location along the travel route at which article transfer is performed between the transport vehicle and the storage section, and (ii) entry of the unmanned aerial vehicle into a given range extending forward in a travel direction of the transport vehicle from the transport vehicle stop location.

According to this configuration, it is possible to avoid interference between the transport vehicle and the unmanned aerial vehicle while controlling the flight of the unmanned aerial vehicle.

Also, it is preferable that the storage section includes a plurality of storage locations at which articles are storable, at least one storage location of the plurality of storage locations is a transferable location at which article carry-in and article carry-out are performed by the transport vehicle, each storage location different from the at least one storage location is a non-transferable location at which neither article carry-in nor article carry-out is performed by the transport vehicle, and the unmanned aerial vehicle performs article transfer between the transferable location and the non-transferable location.

According to this configuration, even if not all of the storage locations in the storage section are transferable locations to and from which articles can be carried in and carried out by the transport vehicle, utilizing the unmanned aerial vehicle makes it possible to store articles in all of the storage locations. This therefore eliminates the need to use a complex mechanism or the like for moving an article between a transferable location and a non-transferable location.

Also, it is preferable that the storage section includes a plurality of storage location rows each including the plurality of storage locations aligned in a route extending direction that is a direction along the travel route, and the storage location rows are arranged next to each other in at least one of an up-down direction and a route width direction orthogonal to the route extending direction in a view along the up-down direction.

According to this configuration, a relatively large number of articles can be stored in the storage section while also suppressing an increase in the size of the storage section.

INDUSTRIAL APPLICABILITY

The present invention is applicable to an article transport facility that can efficiently transport articles while having a low equipment cost.

What is claimed is:

1. An article transport facility comprising:
    a transport vehicle configured to travel along a predetermined travel route and perform article transport;
    an unmanned aerial vehicle configured to fly along a route and perform article transport;
    a transfer section provided in correspondence with a processing device configured to perform article processing, and to and from which an article that is a processing target of the processing device is transferred; and
    a plurality of storage sections, each of the plurality of storage sections arranged at a location along the travel route and configured to perform article storage,
    wherein the transport vehicle performs article carry-in and article carry-out with respect to at least one same storage section of the plurality of storage sections, and
    wherein the unmanned aerial vehicle performs article transport between each storage section of the plurality of storage sections and the transfer section.

2. The article transport facility according to claim 1, further comprising:
    a plurality of unmanned aerial vehicles, each of which corresponds to the unmanned aerial vehicle; and
    a plurality of transfer sections, each of which corresponds to the transfer section;
    wherein the transport vehicle performs article transport between the plurality of storage sections,
    wherein each of the plurality of storage sections has a correspondence relationship to one or more transfer sections of the plurality of transfer sections, and
    wherein each of the plurality of unmanned aerial vehicles performs article transport between each of the plurality of storage sections and the one or more transfer sections having the correspondence relationship to each other.

3. The article transport facility according to claim 2, wherein each of the plurality of storage sections has a waiting site at which the unmanned aerial vehicle is capable of taking off and landing, and at which the unmanned aerial vehicle that landed is capable of waiting.

4. The article transport facility according to claim 2, further comprising:
    a control device configured to control the plurality of unmanned aerial vehicles,
    wherein the control device sets a plurality of transport areas each comprising at least one of the plurality of transfer sections and at least one of the plurality of storage sections, and
    wherein the control device assigns each of the plurality of transport areas for at least one unmanned aerial vehicle of the plurality of unmanned aerial vehicles to perform article transport.

5. The article transport facility according to claim 4, wherein the control device calculates a degree of busyness regarding article transport performed by the at least one unmanned aerial vehicle in each of the plurality of transport areas, and
    wherein the control device sets the number of the at least one unmanned aerial vehicle performing article transport in each of the plurality of transport areas in such a manner that the degree of busyness approaches a set value in each of the plurality of transport areas.

6. The article transport facility according to claim 5, wherein the control device calculates, as the degree of busyness, the average value of at least one of (i) first time which is a length of time from when a request is given for an article processed by the processing device to be retrieved at the transfer section until when the processed article is retrieved by the unmanned aerial vehicle, and (ii) second time which is a length of time from when a request is given for an article to be transferred to the transfer section in order for the article to be processed by the processing device until when the article is transported to the transfer section by the unmanned aerial vehicle.

7. The article transport facility according to claim 4, wherein the control device sets a no-fly area in which flight of the unmanned aerial vehicle is prohibited, in a region between a first transport area that is one of the plurality of transport areas and a second transport area that is one of the plurality of transport areas different from the first transport area, and
wherein the transport vehicle, in addition to performing article transport, is further configured to transport the unmanned aerial vehicle between the first transport area and the second transport area.

8. The article transport facility according to claim 1, further comprises:
a plurality of unmanned aerial vehicles each of which corresponds to the unmanned aerial vehicle; and
a control device configured to control the plurality of unmanned aerial vehicles, and
wherein in response to the transport vehicle is in a specified range including a transport vehicle stop location, which is a location along the travel route at which the transport vehicle stops in order to perform article carry-in or article carry-out with respect to each of the plurality of storage sections, the control device prohibits (i) arrival of the unmanned aerial vehicle at a transfer location, which is a location along the travel route at which article transfer is performed between the transport vehicle and each of the plurality of storage sections, and (ii) entry of the unmanned aerial vehicle into a given range extending forward in a travel direction of the transport vehicle from the transport vehicle stop location.

9. The article transport facility according to claim 1, wherein:
each of the plurality of storage sections comprises a plurality of storage locations at which articles are storable
at least one storage location of the plurality of storage locations is a transferable location at which article carry-in and article carry-out are performed by the transport vehicle,
each storage location different from the at least one storage location is a non-transferable location at which neither article carry-in nor article carry-out is performed by the transport vehicle, and
the unmanned aerial vehicle performs article transfer between the transferable location and the non-transferable location.

10. The article transport facility according to claim 9, wherein each of the plurality of storage sections comprises a plurality of storage location rows each comprising the plurality of storage locations aligned in a route extending direction that is a direction along the travel route, and
wherein the plurality of storage location rows are arranged next to each other in at least one of an up-down direction and a route width direction orthogonal to the route extending direction in a view along the up-down direction.

11. The article transport facility according to claim 1, further comprising:
a plurality of unmanned aerial vehicles each of which corresponds to the unmanned aerial vehicle;

a plurality of transfer sections each of which corresponds to the transfer section;
a plurality of transport areas each including at least one of the plurality of transfer sections and at least one of the plurality of storage sections,
wherein the transport vehicle transports the article between the different transport areas,
wherein for each of the plurality of transport areas, at least one unmanned aerial vehicle of the plurality of unmanned aerial vehicles responsible for article transport in a corresponding transport area is assigned, and
the unmanned aerial vehicle transports the article between each of the plurality of storage sections and the transfer section arranged in the corresponding transport area.

12. The article transport facility according to claim 1, wherein the unmanned aerial vehicle transports the article, which is to be carried into the processing device, to at least the transfer section.

13. A method of control for an article transport facility, the article transport facility comprising a transport vehicle configured to travel along a predetermined travel route and perform article transport, a plurality of unmanned aerial vehicles each of which configured to fly along a route and perform article transport, a plurality of transfer sections each of which provided in correspondence with a processing device configured to perform article processing, and to and from which an article that is a processing target of the processing device is transferred, a plurality of storage sections each of which arranged at a location along the travel route and configured to perform article storage, and a control device configured to control the plurality of unmanned aerial vehicles, wherein the transport vehicle performs article carry-in and article carry-out with respect to each of the plurality of storage sections, and each of the plurality of unmanned aerial vehicles performs article transport between each of the plurality of storage sections and the transfer section, the method comprising:
setting, with the control device, a correspondence relationship between each of the plurality of storage sections and to one or more transfer sections of the plurality of transfer sections; and
performing article transport, with each of the plurality of unmanned aerial vehicles, between the storage section and the one or more transfer sections having the correspondence relationship to each other.

14. The method of claim 13, further comprising:
setting a plurality of transport areas each including at least one of the plurality of transfer sections and at least one of the plurality of storage sections; and
assigning each of the plurality of transport areas for at least one unmanned aerial vehicle of the plurality of unmanned aerial vehicles to perform article transport.

15. The method of claim 14, further comprising:
calculating a degree of busyness regarding article transport performed by the at least one unmanned aerial vehicle in each of the plurality of transport areas; and
setting the number of the at least one unmanned aerial vehicle performing article transport in each of the plurality of transport areas in such a manner that the degree of busyness approaches a set value in each of the plurality of transport areas.

16. The method of claim 15, wherein the degree of busyness is calculated as the average value of at least one of (i) first time which is a length of time from when a request is given for an article processed by the processing device to be retrieved at the transfer section until when the processed article is retrieved by the at least one unmanned aerial vehicle, and (ii) second time which is a length of time from when a request is given for an article to be transferred to the transfer section in order for the article to be processed by the processing device until when the article is transported to the transfer section by the at least one unmanned aerial vehicle.

17. The method of claim 15, further comprising:
setting a no-fly area in which flight of the at least one unmanned aerial vehicle is prohibited in a region between a first transport area that is one of the plurality of transport areas and a second transport area that is one of the plurality of transport areas different from the first transport area; and
transporting, with the transport vehicle, the at least one unmanned aerial vehicle between the first transport area and the second transport area, in addition to the transport vehicle performing article transport.

18. The method of claim 13, further comprising, in response to the transport vehicle being in a specified range including a transport vehicle stop location:
prohibiting (i) arrival of at least one unmanned aerial vehicle of the plurality of unmanned aerial vehicles at a transfer location, which is a location along with the travel route at which article transfer is performed between the transport vehicle and each of the plurality of storage sections, and (ii) entry of the at least one unmanned aerial vehicle into a given range extending forward in a travel direction of the transport vehicle from the transport vehicle stop location,
wherein the transport vehicle stop location is a location along the travel route at which the transport vehicle stops in order to perform article carry-in or article carry-out with respect to each of the plurality of storage sections.

19. The method of claim 13, wherein each of the plurality of storage sections comprises a plurality of storage locations at which articles are storable, the method further comprising:
setting at least one storage location of the plurality of storage locations as a transferable location at which article carry-in and article carry-out are performed by the transport vehicle,
setting each storage location different from the at least one storage location as a non-transferable location at which neither article carry-in nor article carry-out is performed by the transport vehicle, and
transferring, with at least one unmanned aerial vehicle of the plurality of unmanned aerial vehicles, the article between the transferable location and the non-transferable location.

* * * * *